United States Patent
Kaeser et al.

(10) Patent No.: US 10,255,713 B2
(45) Date of Patent: Apr. 9, 2019

(54) SYSTEM AND METHOD FOR DYNAMICALLY ADJUSTING RENDERING PARAMETERS BASED ON USER MOVEMENTS

(71) Applicant: Google Inc., Mountain View, CA (US)

(72) Inventors: Dominik Philemon Kaeser, Mountain View, CA (US); John Carl Anderson, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 267 days.

(21) Appl. No.: 14/583,889

(22) Filed: Dec. 29, 2014

(65) Prior Publication Data

US 2016/0189423 A1    Jun. 30, 2016

(51) Int. Cl.
*G06T 17/00* (2006.01)
*G06T 15/20* (2011.01)
(Continued)

(52) U.S. Cl.
CPC ............. *G06T 15/20* (2013.01); *G06F 3/012* (2013.01); *G06F 3/04815* (2013.01); *G06T 2210/36* (2013.01)

(58) Field of Classification Search
CPC ..... G06T 17/00; G06T 15/20; G06T 2210/36; G06T 17/20; G06T 19/00; G06T 17/10; G06T 17/005; G06T 19/006; G06T 19/20; G06T 7/20; G06T 15/205; G06T 2200/24; G06T 2215/16; G06T 15/04; G06T 13/40; G06F 3/012; G06F 3/04815; G06F 1/163; G06F 3/04842; G06F 3/0346;
(Continued)

(56) References Cited

U.S. PATENT DOCUMENTS 5,446,834 A    8/1995    Deering
6,839,041 B2   1/2005    Susnfara et al.
(Continued)

OTHER PUBLICATIONS

Funkhouser et al., "Adaptive Display Algorithm for Interactive Frame Rates During Visualization of Complex Virtual Environments", Proceedings of the 20$^{th}$ Annual Conference on Computer Graphics and Interactive Techniques, Anaheim, California, Aug. 1-6, 1993, pp. 247-254.
(Continued)

*Primary Examiner* — Xilin Guo
(74) *Attorney, Agent, or Firm* — Dority & Manning, P.A.

(57) ABSTRACT

A computer-implemented method for dynamically adjusting rendering parameters based on user movements may include determining viewpoint movement data for a user viewing a rendering of a 3D model at a first time, determining a first level-of-detail at which to render the 3D model based at least in part on the viewpoint movement data at the first time and rendering the 3D model at the first level-of-detail. The method may also include determining viewpoint movement data for the user at a second time, wherein the viewpoint movement data at the second time differs from the viewpoint movement data at the first time. In addition, the method may include determining a second level-of-detail at which to render the 3D model based at least in part on the viewpoint movement data at the second time and rendering the 3D model at the second level-of-detail, wherein the second level-of-detail differs from the first level-of-detail.

16 Claims, 5 Drawing Sheets

(51) Int. Cl.
*G06F 3/01* (2006.01)
*G06F 3/0481* (2013.01)

(58) Field of Classification Search
CPC ........ G06F 3/0481; G06F 3/14; G06F 17/211; G06F 17/212; G06F 3/147; G06F 3/013; G02B 2027/0187; G02B 2027/0178; G02B 2027/0138; G02B 27/017; G02B 27/0179; G02B 2027/014; G02B 27/0172; H04N 1/00214; H04N 5/23216; H04N 5/23296; H04N 13/332; H04N 13/378; H04N 5/144; G06K 7/10366; G06K 9/00671; G06K 9/0063; H04L 43/16; H04L 51/18; H04L 5/0082
See application file for complete search history.

(56) References Cited

U.S. PATENT DOCUMENTS

| | | | | |
|---|---|---|---|---|
| 2007/0162223 | A1* | 7/2007 | Clark | G01C 21/3415 701/416 |
| 2012/0154277 | A1* | 6/2012 | Bar-Zeev | G02B 27/017 345/158 |
| 2013/0057638 | A1* | 3/2013 | Tamkivi | H04W 4/027 348/14.02 |
| 2013/0241955 | A1* | 9/2013 | Tamaru | G02B 27/01 345/633 |
| 2014/0253588 | A1* | 9/2014 | Mandala | G02B 27/01 345/633 |
| 2014/0267420 | A1 | 9/2014 | Schowengerdt et al. | |
| 2015/0153570 | A1* | 6/2015 | Yamamoto | H04M 1/72563 345/184 |
| 2016/0034042 | A1* | 2/2016 | Joo | G02B 27/0172 345/633 |

OTHER PUBLICATIONS

Regan at al., "Priority Rendering with a Virtual Reality Address Recalculation Pipeline", Proceedings of the 21st Annual Conference on Computer Graphics and Interactive Techniques, Orlando, Florida, Jul. 24-29, 1994, pp. 155-162.

Schaufler et al., "A Three Dimensional Image Cache for Virtual Reality", Computer Graphics Forum, vol. 15, No. 3, Aug. 1996, pp. C-227-C235.

* cited by examiner

FIG. 5

SYSTEM AND METHOD FOR DYNAMICALLY ADJUSTING RENDERING PARAMETERS BASED ON USER MOVEMENTS

FIELD

The present subject matter relates generally to a system and method for dynamically adjusting rendering parameters based on user movements and, more particularly, to a system and method for adjusting the level-of-detail at which a 3D model is rendered based on the head velocity of the user viewing the 3D model.

BACKGROUND

In many applications, such as virtual reality applications, it is desirable to display an immersive, highly visual, three-dimensional (3D) environment or model to a user. To provide an enjoyable experience to a user viewing a displayed 3D model, virtual reality applications typically require high frame rates and, thus, low rendering times. For example, if a frame takes longer than 5-10 milliseconds (ms) to render, it is likely to be dropped, which leads to a judder effect that significantly impacts the user's experience. In addition to low rendering times, it is also desirable to provide a virtual reality 3D model with an extremely high level-of-detail (e.g., a high output resolution).

SUMMARY

Aspects and advantages of embodiments of the invention will be set forth in part in the following description, or may be obvious from the description, or may be learned through practice of the embodiments.

In one aspect, the present subject matter is directed to a computer-implemented method for dynamically adjusting rendering parameters based on user movements. The method may generally include determining viewpoint movement data for a user viewing a rendering of a 3D model at a first time, determining a first level-of-detail at which to render the 3D model based at least in part on the viewpoint movement data for the user at the first time and rendering the 3D model at the determined first level-of-detail. The method may also include determining viewpoint movement data for the user viewing the rendering of the 3D model at a second time, wherein the viewpoint movement data at the second time differs from the viewpoint movement data at the first time. In addition, the method may include determining a second level-of-detail at which to render the 3D model based at least in part on the viewpoint movement data for the user at the second time and rendering the 3D model at the determined second level-of-detail, wherein the second level-of-detail differs from the first level-of detail.

In another aspect, the present subject matter is directed to a system for dynamically adjusting rendering parameters based on user movements. The system may generally include one or more computing devices having at least one processor and associated memory. The memory may store instructions that, when implemented by the at least one processor, configure the computing device(s) to determine a head velocity of a user viewing a rendering of a 3-D model at a first time, wherein the head velocity at the first time is less than a first velocity threshold. The computing device(s) may also be configured to determine a first level-of-detail at which to render the 3D model based at least in part on the head velocity of the user at the first time and render the 3D model at the determined first level-of-detail. In addition, the computing device(s) may be configured to determine the head velocity of the user viewing the rendering of the 3D model at a second time, wherein the head velocity at the second time is greater than the first velocity threshold. Moreover, the computing device(s) may be configured to determine a second level-of-detail at which to render the 3D model based at least in part on the head velocity of the user at the second time and render the 3D model at the determined second level-of-detail, wherein the second level-of-detail is less than the first level-of-detail.

In a further aspect, the present subject matter is directed to a tangible, non-transitory computer-readable medium storing computer-executable instructions that, when executed by one or more processors, cause the processor(s) to perform specific operations. The operations may generally include determining a head velocity of a user viewing a rendering of a 3D model at a first time, wherein the head velocity at the first time is greater than a first velocity threshold. The operations may also include determining a first level-of-detail at which to render the 3D model based at least in part on the head velocity of the user at the first time and rendering the 3D model at the determined first level-of-detail. In addition, the operations may include determining the head velocity of the user viewing the rendering of the 3D model at a second time, wherein the head velocity at the second time is less than the first velocity threshold. Moreover, the operations may include determining a second level-of-detail at which to render the 3D model based at least in part on the head velocity of the user at the second time and rendering the 3D model at the determined second level-of-detail, wherein the second level-of detail is greater than the first level-of-detail.

Other exemplary aspects of the present disclosure are directed to other methods, systems, apparatus, non-transitory computer-readable media, user interfaces and devices for dynamically adjusting rendering parameters based on user movements.

These and other features, aspects and advantages of the various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art, are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation. In fact, it will be apparent to those skilled in the art that various modifications and variations can be made to the embodiments without departing from the scope or spirit of the embodiments. For instance, features illustrated or described as part of one embodiment can be used with another embodiment to yield a still further embodiment. Thus, it is intended that the present subject matter cover such modifications and variations as come within the scope of the appended claims and their equivalents.

Overview

In general, the present subject matter is directed to a system and method for dynamically adjusting rendering parameters based on user movements. Specifically, in several embodiments, the system and method may be utilized to dynamically adjust the level-of-detail (LOD) at which a three-dimensional (3D) model is being rendered based on viewpoint movement data associated with the user viewing the 3D model. For example, a user viewing an immersive, 3D virtual reality environment (e.g., via a head-mounted display) may continuously move his/her head in order to adjust his/her viewpoint relative to the 3D model. As a result, the image frames being rendered to display the 3D model to the user must be continuously updated based on the user's head movement so as to provide the desired interactive experience typically associated with a virtual reality application. In this regard, a relatively high frame rate and, thus, a relatively low rendering time is typically required to avoid judder effects that negatively impact the user's overall experience. Unfortunately, it is quite challenging to achieve a high LOD for the 3D model while still maintaining low rendering times.

To address this issue, the present disclosure provides for the LOD to be dynamically adjusted based on the velocity at which the user is moving his/her head while viewing the 3D model. Specifically, in several embodiments, the LOD at which the frames are rendered may be decreased as the user's head velocity increases and vice versa. Such dynamic adjustment of the LOD may allow for a 3D virtual reality environment to be rendered at a high frame rate for high head velocities while preserving the visual quality of the displayed environment when the user is actually taking the time to view the details of the environment (e.g., when the user's head velocity is low or zero). For example, judder effects are particularly problematic when the user is moving his/her head quickly. Thus, by reducing the LOD at which the 3D model is being rendered when the user's head velocity is high, a higher frame rate may be achieved, thereby reducing and/or eliminating any judder effects. In contrast, when the user's head velocity is low, the frame rate may be reduced without resulting in any judder effects. As a result, the LOD associated with the 3D model may be increased so as to provide an enhanced visual experience to the user.

In several embodiments, the LOD may be decreased in a stepwise manner with increases in the user's head velocity. For example, in particular embodiment of the present subject matter, a low velocity threshold and a high velocity threshold may be defined for adjusting the LOD. In such an embodiment, when the user's head velocity is below the low velocity threshold, the frames may be rendered at a high LOD (e.g., a high texture and/or output resolution and/or a high geometric complexity). However, when the user's head velocity exceeds the low velocity threshold, the LOD at which the frames are being rendered may be adjusted to a medium LOD that is less than the high LOD (e.g., a lower texture and/or output resolution and/or a lower geometric complexity). The LOD may then be maintained at the medium LOD until the user's head velocity exceeds the high velocity threshold, at which point the LOD may be reduced to a low LOD that is less than the medium LOD.

Additionally, in several embodiments, the LOD may be increased in a linear manner in response to decreases in the user's head velocity. Specifically, as opposed to the stepwise manner in which the LOD is decreased with increases in the user's head velocity, a predetermined ramp rate may be used to steadily increase the LOD when the user's head velocity drops below one of the predetermined velocity thresholds. For example, when the user's head velocity is initially above the high velocity threshold and is then reduced to a velocity between the high and low velocity thresholds, the LOD may be ramped up from the low LOD to the medium LOD at the predetermined ramp rate. Similarly, when the user's head velocity is initially between the high and low velocity thresholds and is then reduced to a velocity below the low velocity threshold, the LOD may be ramped up from the medium LOD to the high LOD at the predetermined ramp rate.

Moreover, in several embodiments, the disclosed system and method may be configured to implement a delay period prior to increasing the LOD at which the 3D model is being rendered, thereby allowing for some dampening/hysteresis for the head velocity measurements. For example, when the user's head velocity is initially above the high velocity threshold and is then reduced to a velocity between the high and low velocity thresholds, it may be desirable to wait a predetermined time period prior to ramping up the level-of-detail from the low LOD to the medium LOD to ensure that the user's head velocity has been maintained at a level between the high and low velocity thresholds.

It should be appreciated that the technology described herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer processes discussed herein may be implemented using a single computing device or multiple computing devices working in combination. Databases and applications may be implemented on a single system or distributed across multiple systems. Distributed components may operate sequentially or in parallel.

Figure 1:
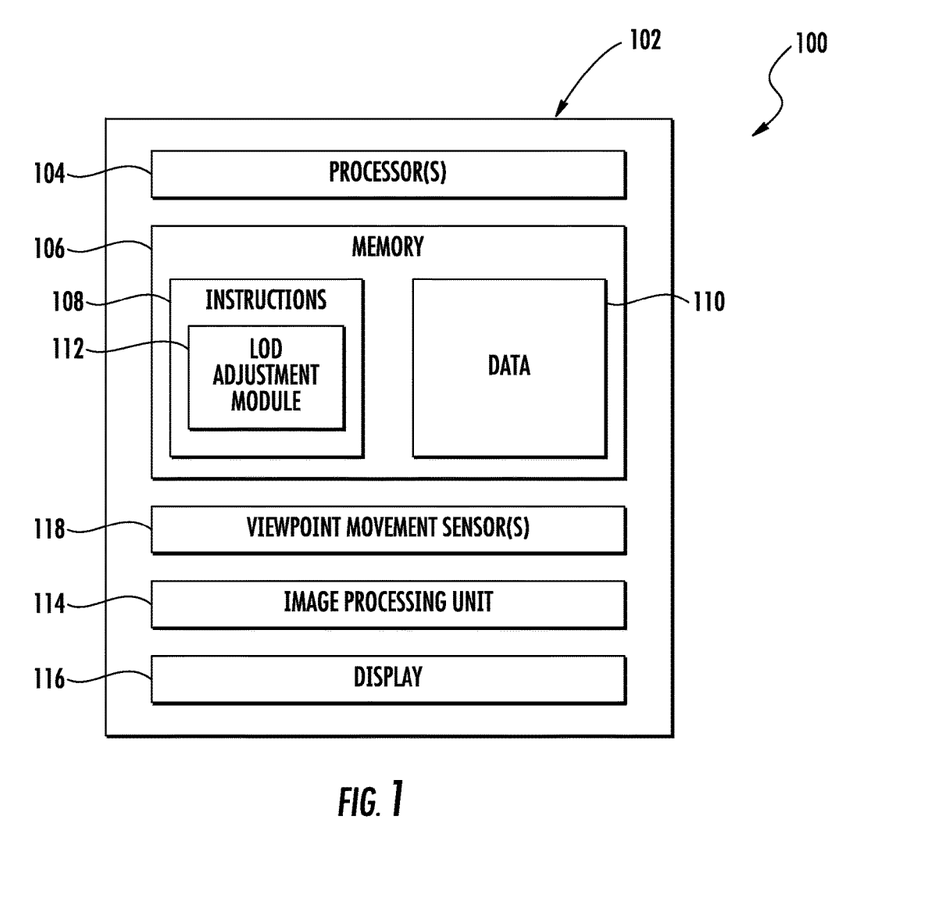
FIG. 1 illustrates a schematic view of one embodiment of a system for dynamically adjusting rendering parameters based on user movements in accordance with aspects of the present subject matter, particularly illustrating the system including a computing device configured to render/display a 3D model corresponding to an immersive, 3D virtual reality environment.

Example Systems for Dynamically Adjusting Rendering Parameters Based on User Movements Referring now to FIG. 1, one embodiment of a system 100 for dynamically adjusting rendering parameters based on user movements is illustrated in accordance with aspects of the present subject matter. As shown in FIG. 1, the system 100 may include a computing device 102 configured to render a 3D model for display to a user, such as a 3D model corresponding to an immersive, 3D virtual reality environment. In general, the computing device 102 may correspond to any suitable computing device(s) and/or other processor-based device(s) known in the art, including any combination of computing devices and/or processor-based device(s). For instance, in several embodiments, the computing device 102 may correspond to a head-mounted display unit configured to be worn on the user's head. However, in other embodiments, the computing device 102 may correspond to any other suitable display or electronic device having one or more processors coupled thereto and/or embedded therein so as to allow the device 102 to render and display a 3D model to the user, such as a laptop computer, a desktop computer, a tablet, a smartphone and/or the like.

As shown, the computing device 102 may include a processor(s) 104 and a memory 106. The processor(s) 104 may be any suitable processing device, such as a microprocessor, microcontroller, integrated circuit, or other suitable processing device. Similarly, the memory 106 may include any suitable computer-readable medium or media, including, but not limited to, non-transitory computer-readable media, RAM, ROM, hard drives, flash drives, or other memory devices. The memory 106 may generally store information accessible by processor(s) 104, including instructions 108 that can be executed by processor(s) 104 and data 110 that can be retrieved, manipulated, created, or stored by processor(s) 104. In several embodiments, the data 110 may be stored in one or more databases.

As shown in FIG. 1, in several embodiments, the instructions stored within the memory may be executed by the processor(s) to implement a level-of-detail (LOD) adjustment module 112. In general, the LOD adjustment module 112 may be configured to dynamically adjust the LOD at which the 3D model is being rendered by the computing device 102 based on viewpoint movement data associated with a user viewing the 3D model. Specifically, as will be described below, the disclosed computing device 102 may be configured to receive data associated with the velocity of a user's head (referred to herein as "head velocity") as the user is viewing the 3D model. For instance, when a user is wearing a head-mounted display unit, the user may continuously move his/her head while viewing a displayed 3D model representing a 3D virtually reality environment. By utilizing the head velocity data for the user, the LOD adjustment module 112 may be configured to dynamically adjust the LOD at which the 3D model is being rendered as the user's head velocity increases and/or decreases. For example, when the user's head velocity is relatively high, the LOD may be set to a relatively low level, which, in turn, may allow for the computing device 102 to render the 3D model at a substantially high frame rate, thereby reducing and/or eliminating any judder effects. However, when the user's head velocity is relatively low, judder effects are not problematic. As a result, the LOD for the 3D model may be set to a relatively high level so as to preserve the visual quality of the 3D model during the time at which the user is most likely to appreciate the fine details provided within the model.

It should be appreciated that, as used herein, the term "level-of-detail" or "LOD" may generally correspond to any suitable parameter that may impact the visual quality of a rendered 3D model. For example, in several embodiments, the LOD may correspond to the output resolution of the 3D model, the texture resolution of the 3D model and/or the geometric complexity of the 3D model. In such embodiments, the LOD adjustment module 112 may be configured to increase or decrease the LOD of the 3D model being rendered by increasing or decreasing one or any combination of the output resolution, the texture resolution and the geometric complexity associated with the 3D model.

It should also be appreciated that certain 3D models may include multiple components, such as multiple surfaces, textures and/or meshes. For such a 3D model, the LOD adjustments described herein may be applied generally to the 3D model as a whole (e.g., by making the same LOD adjustment to each component of the model) or specifically to one or more of the individual components of the model. For instance, LOD adjustments may be made so that a different LOD is selected for different components of the 3D model.

Additionally, in several embodiments, one or more of the processors 104 and/or associated memory 106 may be included within an image processing unit 114 of the computing device 102. In general, the image processing unit 114 may correspond to any suitable specialized electronic circuit configured to manage and/or accelerate the rendering of images for subsequent display to a user. For instance, the image processing unit 114 may correspond to any suitable graphics processing unit (GPU) or visual processing unit (VPU).

Referring still to FIG. 1, the computing device 102 may also include or be coupled to a display 116 for displaying a rendered 3D model to the user of the device 102. As indicated above, in several embodiments, the computing device 102 may correspond to a head-mounted display unit configured to be worn on the user's head. In such embodiments, the display 116 may, for example, correspond to a suitable display panel(s) or device(s) configured to be positioned adjacent to the user's eyes or to otherwise project light onto the user's eyes via a suitable optical path. However, in other embodiments, the display 116 may correspond to any other suitable display panel(s) and device(s) configured to display the 3D model rendered by the computing device 102 to the user.

Moreover, as shown in FIG. 1, the computing device 102 may also include or be coupled to one or more viewpoint movement sensors 118 configured to monitor a viewpoint movement parameter(s) associated with the user as he/she is viewing the 3D model presented on the display 116. In general, the monitored viewpoint movement parameter(s) may correspond to any suitable parameter(s) that is associated with a change in the user's viewpoint relative to a fixed viewpoint location as the user is viewing the displayed 3D model. For example, parameters impacting the user's viewpoint may include, but are not limited to, the user's head velocity, the acceleration of the user's head, the orientation of the user's head and/or the eye gaze location of the user. Thus, in several embodiments, the viewpoint movement sensor(s) 118 may correspond to one or more speed or velocity sensors, one or more accelerometers, one or more orientation sensors and/or one or more eye tracking devices/sensors. However, in other embodiments, the viewpoint movement sensor(s) 118 may correspond to any other suitable sensor(s) and/or sensing device(s) that allows the viewpoint movement parameter(s) associated with a user of the computing device 102 to be directly or indirectly monitored.

Figure 5:
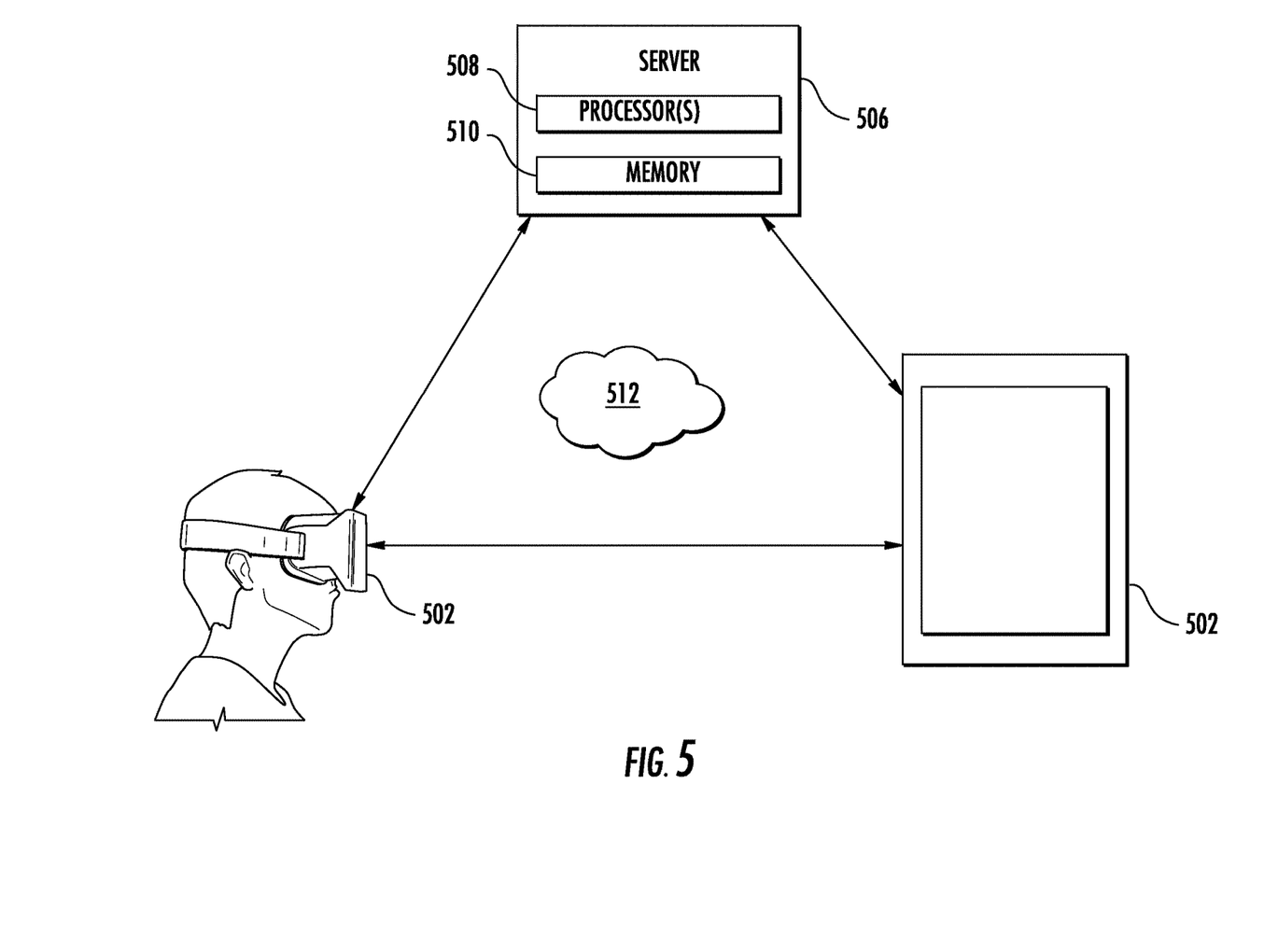
FIG. 5 illustrates a schematic view of examples of computing devices that may be configured to implement the various computer processes described herein in accordance with aspects of the present subject matter.

As indicated above, it should be appreciated that the various computer processes described herein may be implemented on a single computing device or multiple computing devices working in combination, including computing devices distributed across a network and/or across multiple systems. For example, FIG. 5 illustrates a schematic view of two separate user devices 502, 504, each of which may include and/or be coupled to one or more of the computing devices 102 described above. Specifically, FIG. 5 illustrates a first user device 502 (e.g., a head-mounted display unit) and a second user device 504 (e.g., a tablet). In one embodiment, each user device 502, 504 may be configured, individually, to implement the various computer processes described herein. Alternatively, the computer processes may be implemented by one or more separate computing devices communicatively coupled to each user device 502, 504, such as a server(s) 506 having one or more processors 508 and associated memory 510. In such an embodiment, the server(s) 506 (or other separate computing device(s)) may be configured to communicate with each user device 502, 504 over a suitable network 512. As a further example, implementation of the computer processes may be distributed across two or more devices, such as any combination of the first user device 502, the second user device 504 and the server(s) 506.

It should be appreciated that the network 512 shown in FIG. 5 may be any type of communications network, such as a local area network (e.g. intranet), wide area network (e.g. Internet), or some combination thereof. The network 512 may also include a direct connection between the first user device 502, the second user device 504 and/or the server(s) 506. In general, communications between the first user device 502, the second user device 504 and/or the server 506 may be carried via a network interface using any type of wired and/or wireless connection, using a variety of communication protocols (e.g. TCP/IP, HTTP, SMTP, FTP), encodings or formats.

Figure 2:
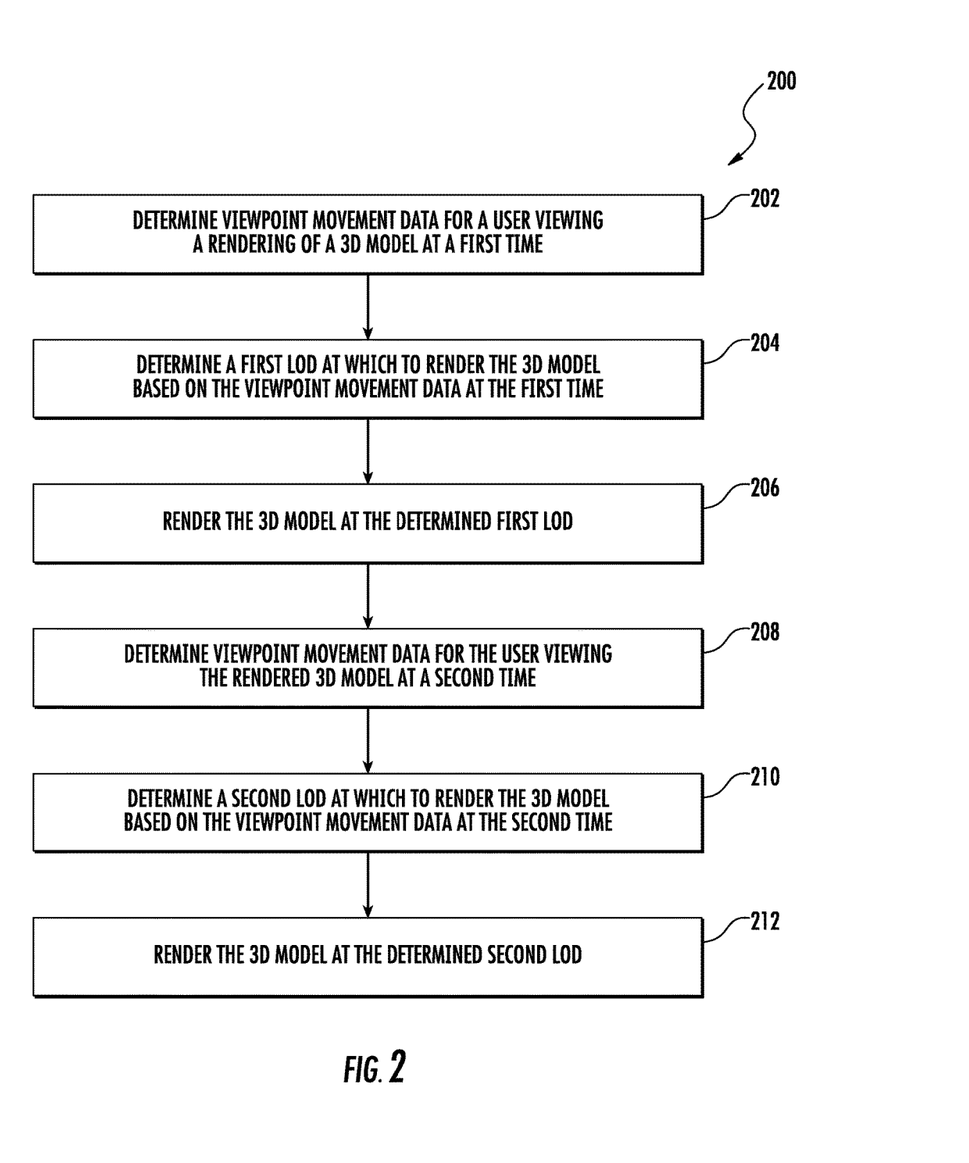
FIG. 2 illustrates a flow diagram of one embodiment of a method for dynamically adjusting rendering parameters based on user movements in accordance with aspects of the present subject matter.

Example Methods for Dynamically Adjusting Rendering Parameters Based on User Movements Referring now to FIG. 2, a flow diagram of one embodiment of a method 200 for dynamically adjusting rendering parameters based on user movements is illustrated in accordance with aspects of the present subject matter. The method 200 will generally be discussed herein with reference to the computing device 102 shown in FIG. 1. However, those of ordinary skill in the art, using the disclosures provided herein, should appreciate that the methods described herein may be executed by any other suitable computing device or combination of computing devices. Additionally, it should be appreciated that, although the method blocks 202-212 are shown in FIG. 2 in a specific order, the various blocks of the disclosed method 200 may generally be performed in any suitable order that is consistent with the disclosure provided herein.

As shown in FIG. 2, at (202), the method 200 includes determining viewpoint movement data for a user viewing a rendering of a 3D model at a first time. Specifically, as indicated above, the computing device 102 may include or be coupled to one or viewpoint movement sensor(s) 118 configured to monitor a viewpoint movement parameter(s) associated with the user as he/she is viewing the 3D model presented on the display 116. For example, in several embodiments, the viewpoint movement parameter may correspond to the user's head velocity as he/she moves his/her head while viewing the 3D model. In such embodiments, the viewpoint movement data may correspond to sensor measurements and/or data associated with the user's head velocity.

Additionally, at (204), the method 200 includes determining a first LOD at which to render the 3D model based at least in part on the viewpoint movement data collected or received for the user at the first time. Specifically, in several embodiments, the LOD at which the 3D model is rendered may be selected based on the monitored viewpoint movement parameter(s). For instance, as indicated above, the LOD adjustment module 112 implemented by the computing device 102 may be configured to select a suitable LOD for the 3D model based on the magnitude of the user's current head velocity (e.g., the head velocity at the first time). Thus, for instance, if the user's head velocity at the first time is relatively low or zero, a first LOD may be selected such that the 3D model is rendered at a substantially high LOD. In contrast, if the user's head velocity at the first time is relatively high, a first LOD may be selected such that the 3D model is rendered at a significantly lower LOD.

At (206), the method 200 includes rendering the 3D model at the determined first LOD. Specifically, based on the particular LOD determined or selected for the current viewpoint movement parameter(s), the computing device 102 may be configured to render the 3D model at the selected first LOD. For instance, the image processing unit 114 of the computing device 102 may be configured to receive a suitable signal(s) associated with the first LOD from the LOD adjustment module 112. The image processing unit 114 may then be configured to render the 3D model in accordance with the selected LOD.

Referring still to FIG. 2, at (208), the method 200 includes determining viewpoint movement data for the user viewing the rendered 3D model at a second time. Specifically, as indicated above, the computing device 102 may be configured to continuously monitor the viewpoint movement parameter(s) associated with the user as he/she is viewing the 3D model (e.g., via the viewpoint movement sensor(s) 118), which may allow for the device 102 to detect variations in the parameter(s). For instance, by continuously monitoring the user's head velocity, the device 102 may detect increases or decreases in such parameter. As will be described below, the LOD adjustment module 112 may then be configured to dynamically adjust the LOD associated with the 3D model based on the detected changes.

Additionally, at (210), the method 200 includes determining a second LOD at which to render the 3D model based at least in part on the viewpoint movement data collected or received for the user at the second time. Specifically, as indicated above, the LOD adjustment module 112 may be configured to adjust the LOD at which the 3D model is rendered based on changes in the monitored viewpoint movement parameter(s). For instance, assuming the user's head velocity increases or decreases from the first time to the second time, the LOD adjustment module 112 may be configured to appropriately adjust the LOD associated with the 3D model to account for such head velocity changes. Specifically, if the head velocity increases between the first time and the second time, it may be necessary to reduce the LOD to ensure that the 3D model is capable of being rendered at a relatively high frame rate so as to avoid any judder effects. In contrast, if the head velocity decreases between the first time and the second time, the LOD adjustment module 112 may instead be able to increase the LOD at which the 3D model is being rendered without introducing any judder effects, thereby significantly improving the visual quality of the rendered 3D model. Similarly, if the head velocity stays the same between the first and second times (e.g., the user is holding his/her head still), the second LOD selected by the LOD adjustment module 112 may, for example, correspond to the same LOD selected for the first LOD (e.g., at block 204).

Moreover, at (212), the method 200 includes rendering the 3D model at the determined second LOD. Specifically, based on the particular LOD determined or selected for the current viewpoint movement parameter(s), the computing device 102 may be configured to render the 3D model at the selected second LOD. For instance, as indicated above, the image processing unit 114 may be configured to receive a suitable signal(s) associated with the second LOD from the LOD adjustment module 112. The image processing unit 114 may then be configured to render the 3D model according to the selected LOD.

Figure 3:
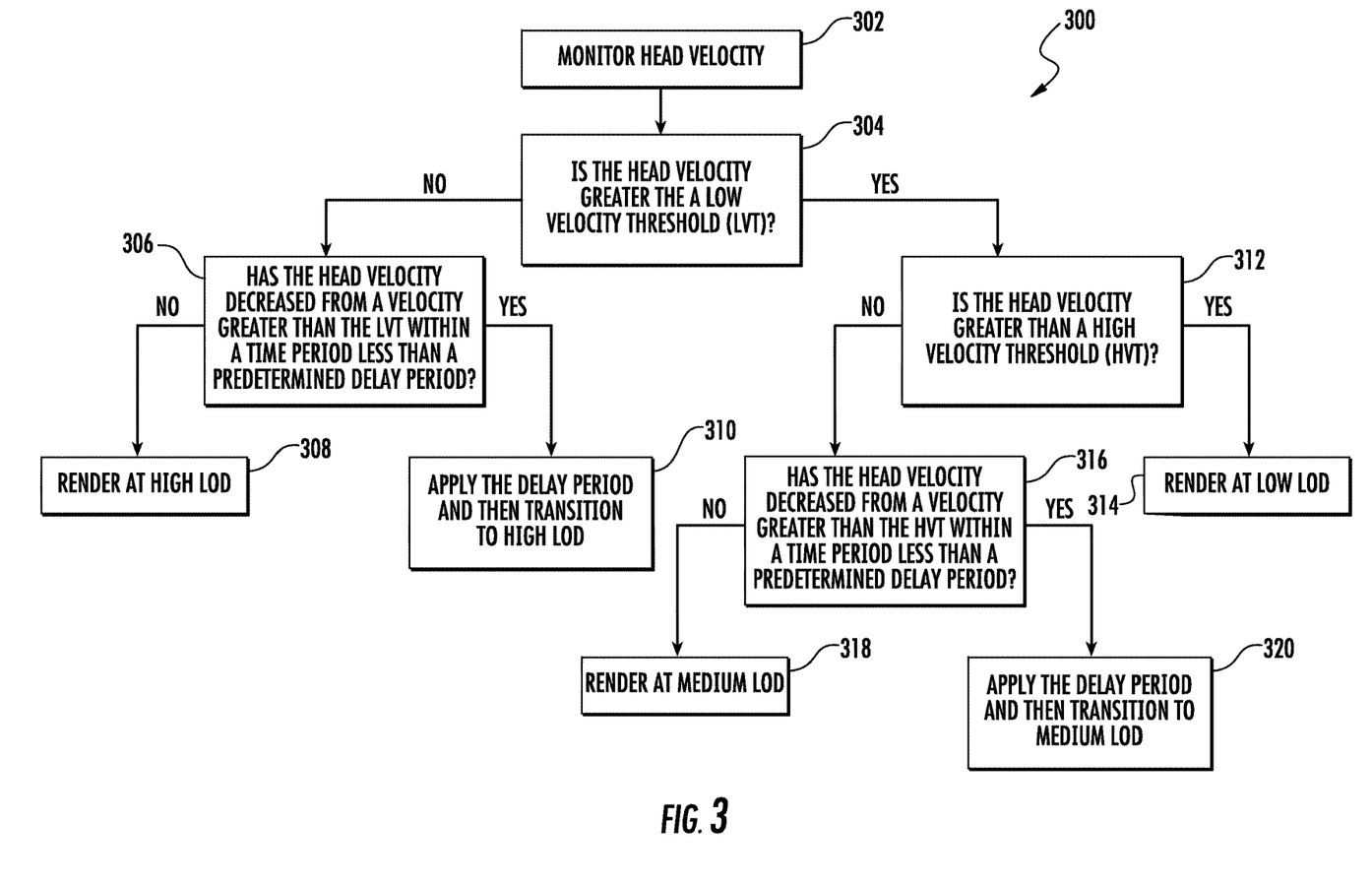
FIG. 3 illustrates a flow diagram of a specific implementation of the method shown in FIG. 2, particularly illustrating a method for dynamically adjusting the level-of-detail at which a 3D model is rendered based on a head velocity of the user viewing the 3D model.

Referring now to FIG. 3, a flow diagram of a specific implementation of the method 200 shown in FIG. 2 is illustrated in accordance with aspects of the present subject matter. In particular, the flow diagram illustrates one embodiment of a method 300 for dynamically adjusting the level-of-detail at which a 3D model is rendered based on the head velocity of the user viewing the 3D model.

As shown in FIG. 3, at (302), the user's head velocity may be monitored while the user is viewing a 3D model presented via the display 116 of the computing device 102. As indicated above, the computing device 102 may include or be coupled to a suitable sensor(s) 118 (e.g., a speed/velocity sensor(s) or any other suitable sensor(s)) configured to measure the user's head velocity. Thus, based on the measurement signals provided by the sensor(s) 118, the computing device 102 may be configured to continuously monitor the user's head velocity.

In several embodiments, the computing device 102 may be configured to monitor the user's head velocity relative to one or more predetermined velocity thresholds. For example, in a particular embodiment, the user's head velocity may be monitored relative to both a low velocity threshold and a high velocity threshold, with the low velocity threshold corresponding to a lower head velocity than the high velocity threshold. In such an embodiment, the particular velocity value selected for each velocity threshold may generally correspond to a head velocity at which it is desired to increase or decrease the LOD at which the 3D model is being rendered so as to provide a desirable experience for the user of the computing device 102. For instance, in one embodiment, the low velocity threshold may correspond to a head velocity ranging from about 0.3 radians per second (rad/s) to about 0.9 rad/s, such as from about 0.45 rad/s to about 0.75 rad/s or from about 0.5 rad/s to about 0.7 rad/s and any other subranges therebetween, and the high velocity threshold may correspond to a head velocity ranging from about 1.5 radians per second (rad/s) to about 2.5 rad/s, such as from about 1.75 rad/s to about 2.25 rad/s or from about 1.9 rad/s to about 2.1 rad/s and any other subranges therebetween. However, in other embodiments, the velocity thresholds may correspond to any other suitable velocity value(s).

In several embodiments, the velocity thresholds may be utilized by the LOD adjustment module 112 to define or select the LOD at which the 3D model is to be rendered. For example, as will be described below, when the user's head velocity is below the low velocity threshold, the LOD adjustment module may be configured to set the LOD at which the 3D model is being rendered at a high LOD (e.g., a high output and/or texture resolution and/or a high geometric complexity). Similarly, when the user's head velocity is above the high velocity threshold, the LOD adjustment module may be configured to set the LOD at which the 3D model is being rendered at a low LOD (e.g., a relatively low output and/or texture resolution and/or a relatively low geometric complexity). Moreover, when the user's head velocity is between the low and high velocity thresholds, the LOD selected for the 3D model may correspond to a medium LOD. In such instance, the medium LOD may, for example, correspond to an LOD associated with an output resolution, texture resolution and/or geometric complexity that is higher than the output resolution, texture resolution and/or geometric complexity associated with the low LOD and that is lower than the output resolution, texture resolution and/or geometric complexity associated with the high LOD.

It should be appreciated that, when defining such differing levels for the LOD, the amount at which the output resolution, texture resolution and/or geometric complexity is increased or decreased between the high, medium and low LODs may generally vary depending on the specific application. However, in particular embodiment, the output resolution, texture resolution and/or geometric complexity may be halved as the LOD associated with the 3D model is decreased from the high LOD to the medium LOD and from the medium LOD to the low LOD. For example, in such an embodiment, the number of pixels included in the 3D model at the medium LOD and the low LOD may be equal to 50% and 25%, respectively, of the number of pixels included in the 3D model at the high LOD.

It should also be appreciated that, although the method 300 shown in FIG. 3 will be described herein with reference to utilizing two velocity thresholds, the method 300 may also be implemented using a single velocity threshold or three or more velocity thresholds. For instance, in an alternative embodiment of the present subject matter, the user's head velocity may be monitored relative to a low velocity threshold, a medium velocity threshold and a high velocity threshold, with the head velocity associated with each threshold increasing from the low velocity threshold to the medium velocity threshold and from the medium velocity threshold to the high velocity threshold.

As shown in FIG. 3, at (304), the monitored head velocity may be compared to the low velocity threshold. If the current head velocity of the user is less than the low velocity threshold, it may be determined, at (306), whether the user's head velocity recently dropped below the low velocity threshold. Specifically, in several embodiments, when it is detected that the user's head velocity is decreasing (or has recently decreased), the disclosed methodology may be configured to implement a predetermined delay period prior to increasing the LOD at which the 3D model is being rendered. Such a delay period may allow for some dampening/hysteresis for the velocity measurements being provided by the sensor(s) 118. In addition, the delay period may prevent the LOD from being unnecessarily increased when the user has only instantaneously reduced his/her head velocity. Thus, for example, if the user's head velocity only temporarily drops below the low velocity threshold prior to being increased quickly back above the threshold (e.g., for a period of time less than the predetermined delay period), the LOD adjustment module 112 may determine that the current LOD associated with the 3D model may be maintained at the previous LOD.

It should be appreciated that the predetermined delay period may generally correspond to any suitable time period that is believed to provide a suitable buffer for implementing increases in the LOD based on decreases in the user's head velocity. For example, in one embodiment, the predetermined delay period may correspond to a time period ranging from about 100 milliseconds (ms) to about 500 ms, such as from about 125 ms to about 350 ms or from about 150 ms to about 250 ms and any other subranges therebetween.

As shown in FIG. 3, if the user's head velocity has not been above the low velocity threshold within a period of time corresponding to the predetermined delay period, the LOD adjustment module 112 may, at (308) be configured to select a high LOD for rendering the 3D model. This may be the case in instances in which the user's head velocity has simply been maintained below the low velocity threshold for a period of time greater than the predetermined delay period or in instances in which the user's head velocity has not yet been increased above the low velocity threshold. In such instances, given the user's low head velocity, it is desirable to render the 3D model at the high LOD to provide the user with a detailed, high quality visual experience.

However, if the user's head velocity has been above the low velocity threshold within a period of time corresponding to the predetermined delay period, the LOD adjustment module 112 may, at (310) be configured to apply the delay period prior to adjusting the LOD at which the 3D model is being rendered to the high LOD. For example, if the 3D model was previously being rendered at the medium LOD due to the user's head velocity being between the low and high velocity thresholds, the LOD adjustment module 112 may be configured to delay increasing the LOD associated with the 3D model from the medium LOD to the high LOD until after the user's head velocity has been below the low velocity threshold for a period of time equal to the predetermined delay period.

Referring still to FIG. 3, at (304), if the current head velocity of the user is greater than the low velocity threshold, the user's head velocity may then, at (312) be compared to the high velocity threshold. As shown in FIG. 3, if the head velocity is greater than the high velocity threshold, the LOD adjustment module may, at (314), be configured to select the low LOD for rendering the 3D model. As indicated above, such a low LOD may be selected for the 3D model when the user's head velocity is relatively high so as to allow the model to be rendered at a substantially high frame rate, thereby reducing and/or eliminating judder effects and, thus, providing a more enjoyable user experience.

However, if the head velocity is less the high velocity threshold and, thus, corresponds to a velocity between the high and low velocity thresholds, the LOD adjustment module 112 may, at (316), determine whether the user's head velocity has recently dropped below the high velocity threshold. Specifically, similar to that described above with reference to block 306, the LOD adjustment module 112 may be configured to implement a predetermined delay period prior to increasing the LOD at which the 3D model is being rendered. Thus, if the user's head velocity has not been above the high velocity threshold within a period of time corresponding to the predetermined delay period, the LOD adjustment module 112 may, at (318), be configured to immediately select a medium LOD for rendering the 3D model. However, if the user's head velocity has been above the high velocity threshold within a period of time corresponding to the predetermined delay period, the LOD adjustment module 112 may, at (320), be configured to apply the delay period prior to adjusting the LOD at which the 3D model is being rendered to the medium LOD. For example, if the 3D model was previously being rendered at the low LOD due to the user's head velocity being above the high velocity threshold, the LOD adjustment module 112 may be configured to delay increasing the LOD associated with the 3D model from the low LOD to the medium LOD until after the user's head velocity has been below the high velocity threshold for a period of time equal to the predetermined delay period.

It should be appreciated that, in several embodiments, the manner in which the LOD is adjusted by the LOD adjustment module 112 may depend on whether the current LOD associated with the 3D model is being increased or decreased. Specifically, in a particular embodiment of the present subject matter, the LOD at which the 3D model is being rendered may be decreased in a stepwise manner with corresponding increases in the user's head velocity relative to the velocity thresholds. For example, when the user's head velocity initially increases from a velocity below the low velocity threshold to a velocity between the low and high velocity thresholds, the LOD associated with the 3D model may be immediately decreased from the high LOD to the medium LOD. Similarly, when user's head velocity increases from a velocity between the low and high velocity thresholds to a velocity above the high velocity threshold, the LOD associated with the 3D model may be immediately decreased from the medium LOD to the low LOD.

In contrast, the LOD at which the 3D model is being rendered may be configured to be increased at a predetermined ramp rate with corresponding decreases in the user's head velocity relative to the velocity thresholds. For example, when the user's head velocity is initially above the high velocity threshold and is then reduced to a velocity between the high and low velocity thresholds, LOD may, after application of the delay period, be ramped up from the low LOD to the medium LOD at the predetermined ramp rate. Similarly, when the user's head velocity decreases from a velocity between the high and low velocity thresholds to a velocity below the low velocity threshold, the LOD may, after application of the delay period, be ramped up from the medium LOD to the high LOD at the predetermined ramp rate.

It should be appreciated that, when implementing such linear increases in the LOD, the predetermined ramp rate utilized by the LOD adjustment module 112 may generally correspond to any suitable ramp rate. However, in a particular embodiment, the LOD adjustment module 112 may be configured to increase the LOD at a rate generally corresponding to one LOD level (e.g., from the low LOD to the medium LOD) within a time period ranging from about 0.5 second to about 1 second, such as from about 0.6 second to about 0.9 second or from about 0.7 second to about 0.8 second and any other subranges therebetween.

Figure 4:
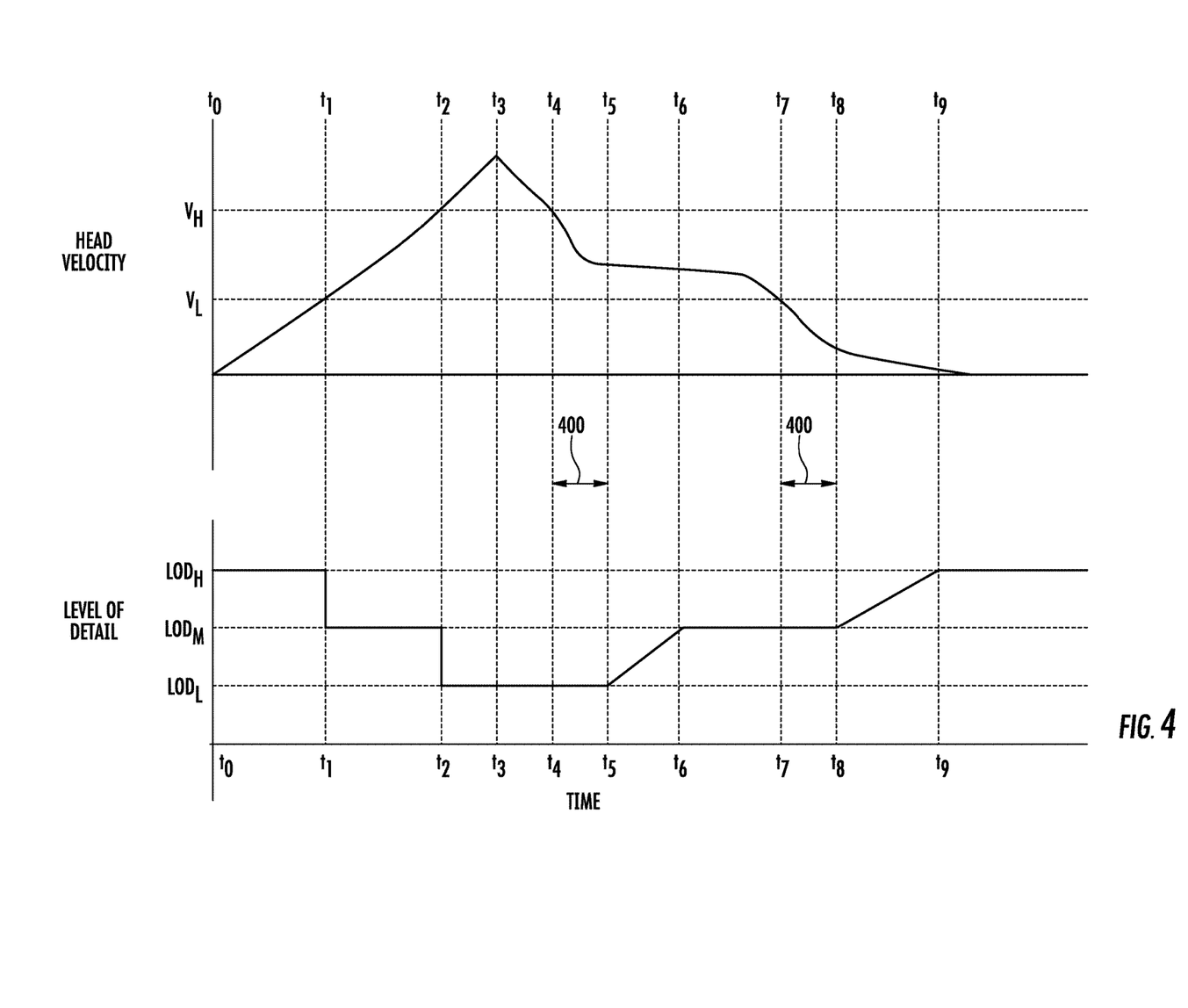
FIG. 4 illustrates an example graph showing one embodiment of the manner in which the level-of-detail may be varied based on changes in the user's head velocity when the method of FIG. 3 is being implemented in accordance with aspects of the present subject matter.

An example showing both the stepwise and linear manners in which the LOD may be decreased and increased, respectively, by the LOD adjustment module 112 with changes in the user's head velocity is illustrated in FIG. 4. Specifically, FIG. 4 illustrates a graphical representation of one example implementation of the method 300 shown in FIG. 3. As shown, FIG. 4 charts both the user's head velocity and the LOD at which the 3D model is being rendered over time. In this regard, $V_L$ corresponds to the low velocity threshold and $V_H$ corresponds to the high velocity threshold. Similarly, $LOD_H$ corresponds to the high LOD, $LOD_M$ corresponds to the medium LOD and $LOD_L$ corresponds to the low LOD.

As shown, the user's head velocity is initially at zero (e.g., at time $t_0$). As a result, the LOD adjustment module 112 may be configured to set the LOD at which the 3D model is being rendered at the high LOD. However, across a given time period (e.g., from time $t_0$ to time $t_3$), the user's head velocity increases. For example, at time $t_1$, the user's head velocity transitions from a velocity below the low velocity threshold to a velocity between the low and high velocity thresholds. As shown, to account for such an increase in the head velocity, the LOD adjustment module 112 may be configured to immediately adjust the LOD at which the 3D model is being rendered in a stepwise manner from the high LOD to the medium LOD. Similarly, as shown in FIG. 4, as the user's head velocity continues to increase, the head velocity transitions (e.g., at time $t_2$) from a velocity between the low and high velocity thresholds to a velocity above the high velocity threshold. At this point, the LOD adjustment module 112 may be configured to immediately adjust the LOD associated with the 3D model in a stepwise manner from the medium LOD to the low LOD.

Additionally, as shown in FIG. 3, at time $t_3$, the user's head velocity begins to decrease over a given time period (e.g., from time $t_3$ to time $t_9$). For example, at time $t_4$, the user's head velocity transitions from a velocity above the high velocity threshold to a velocity between the high and low velocity thresholds. In such instance, instead of immediately adjusting the LOD at which the 3D model is being rendered from the low LOD to the medium LOD, the LOD adjustment module 112 may be configured to delay such an increase in the LOD for a predetermined delay period 400 to ensure sure that the user's head velocity is maintained below the high velocity threshold. For example, as shown in FIG. 4, even though the head velocity is reduced below the high velocity threshold at time $t_4$, the LOD associated with the 3D model is maintained at the low LOD for a time period corresponding to the predetermined delay period 400 (e.g., the time period defined between time $t_4$ and time $t_5$). Thereafter, upon expiration of the delay period 400 at time $t_5$, the LOD adjustment module 112 may be configured to increase the LOD associated with the 3D model in linear manner from the low LOD to the medium LOD. For example, as shown in FIG. 4, the LOD is increased at a predetermined ramp rate from the low LOD to the medium LOD across the time period ranging from time $t_5$ to time $t_6$. Thereafter, the LOD may be maintained at the medium LOD until the head velocity increases above the high velocity threshold (not shown in FIG. 4) or decreases below the low velocity threshold. For example, assuming the user's head velocity increases between time $t_6$ and time $t_7$ to a velocity above the high velocity threshold, the LOD adjustment module 112 may be configured to immediately decrease the LOD associated with the 3D model in a stepwise manner from the medium LOD to the low LOD.

As shown in FIG. 4, at time $t_7$, the user's head velocity transitions from a velocity between the high and low velocity thresholds to a velocity below the low velocity threshold. Similar to the methodology described above, instead of immediately adjusting the LOD at which the 3D model is being rendered from the medium LOD to the high LOD, the LOD adjustment module 112 may be configured to delay increasing the LOD for a predetermined delay period 400 ensure that the user's head velocity will be maintained below the low velocity threshold. For example, as shown in FIG. 4, even though the head velocity is reduced below the high velocity threshold at time $t_7$, the LOD associated with the 3D model is maintained at the medium LOD for a time period corresponding to the predetermined delay period 400 (e.g., the time period between time $t_7$ and time $t_8$). Thereafter, upon expiration of the delay period 400 at time $t_8$, the LOD adjustment module 112 may be configured to increase the LOD associated with the 3D model in linear manner from the medium LOD to the high LOD. For example, as shown in FIG. 4, the LOD is increased at a predetermined ramp rate from the medium LOD to the high LOD across the time period ranging from time $t_8$ to time $t_9$. Thereafter, the LOD may be maintained at the high LOD until the head velocity again shifts above the low velocity threshold. For example, assuming the user's head velocity increases after time $t_9$ to a velocity above the low velocity threshold (not shown in FIG. 4), the LOD adjustment module 112 may be configured to immediately decrease the LOD associated with the 3D model in a stepwise manner from the high LOD to the medium LOD.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for dynamically adjusting rendering parameters based on user movements, the method comprising:

determining, by one or more computing devices, a head velocity for a user viewing a rendering of a 3D model at a first time, the head velocity at the first time being greater than a first velocity threshold;

determining, by the one or more computing devices, a first level-of-detail at which to render the 3D model based at least in part on the head velocity of the user at the first time;

rendering, by the one or more computing devices, the 3D model at the determined first level-of-detail;

determining, by the one or more computing devices, that the head velocity of the user viewing the rendering of the 3D model has dropped below the first velocity threshold;

applying, by the one or more computing devices, a predetermined delay period when it is determined that the head velocity drops below the first velocity threshold, the 3D model being maintained at the first level-of-detail during the predetermined delay period; and after expiration of the predetermined delay period, increasing a level of detail at which the 3D model is rendered from the first level-of-detail to a second level-of-detail at a predetermined rate;

wherein:

the second level-of-detail is greater than the first level-of-detail; and the predetermined ramp rate corresponds to a rate at which the level-of-detail of the 3D model is changed with respect to time such that the level-of-detail is increased over time in accordance with the predetermined ramp rate from the first level-of-detail to the second level-of-detail.

2. The computer-implemented method of claim 1, further comprising monitoring, by the one or more computing devices, the head velocity of the user relative to the first velocity threshold via a viewpoint movement sensor.

3. The computer-implemented method of claim 1, wherein the level-of-detail corresponds to at least one of an output resolution, a texture resolution or a geometric complexity of the rendered 3D model.

4. The computer-implemented method of claim 1, wherein the one or more computing devices form part of a head-mounted display configured to be worn by the user.

5. The computer-implemented method of claim 1, wherein the predetermined delay period is selected based at least in part on an operating characteristic of a viewpoint movement sensor configured to detect the head velocity of the user.

6. The method of claim 1, wherein the predetermined ramp rate corresponds to a linear ramp rate such that the level-of-detail is increased linearly over time from the first level-of-detail to the second level-of-detail.

7. The method of claim 1, wherein the level-of-detail corresponds to a resolution of the rendered 3D model such that the resolution of the rendered 3D model is ramped up over time from the first level-of-detail to the second level-of-detail.

8. A system for dynamically adjusting rendering parameters based on user movements, the system comprising:
    a viewpoint movement sensor configured to detect a head velocity of a user viewing a rendering of a 3-D model as the user's head is moved to adjust a viewpoint of the user relative to the 3-D model;
    one or more computing devices communicatively coupled to the viewpoint movement sensor, the one or more computing devices including at least one processor and associated memory, the memory storing instructions that, when implemented by the at least one processor, configure the one or more computing devices to:
        determine the head velocity of the user at a first time, the head velocity at the first time being greater than a first velocity threshold;
        determine a first level-of-detail at which to render the 3D model based at least in part on the head velocity of the user at the first time;
        render the 3D model at the determined first level-of-detail;
        determine that the head velocity of the user viewing the rendering of the 3D model has dropped below the first velocity threshold;
        apply a predetermined delay period when it is determined that the head velocity drops below the first velocity threshold, the 3D model being maintained at the first level-of-detail during the predetermined delay period; and
        after expiration of the predetermined delay period, increase a level of detail at which the 3D model is rendered from the first level-of-detail to a second level-of-detail at a predetermined ramp rate, the second level-of-detail being greater than the first level-of-detail;
        wherein the predetermined ramp rate corresponds to a rate at which the level-of-detail of the 3D model is changed with respect to time such that the level-of-detail is increased over time in accordance with the predetermined ramp rate from the first level-of-detail to the second level-of-detail.

9. The system of claim 8, wherein the level-of-detail corresponds to at least one of an output resolution, a texture resolution or a geometric complexity of the rendered 3D model.

10. The system of claim 8, wherein the one or more computing devices form part of a head-mounted display configured to be worn by the user.

11. The system of claim 8, wherein the predetermined delay period is selected based at least in part on an operating characteristic of a viewpoint movement sensor configured to detect the head velocity of the user.

12. A tangible, non-transitory computer-readable medium storing computer-executable instructions that, when executed by one or more processors, cause the one or more processors to perform operations, comprising:
    determining a head velocity of a user viewing a rendering of a 3D model at a first time, the head velocity at the first time being greater than a first velocity threshold;
    determining a first level-of-detail at which to render the 3D model based at least in part on the head velocity of the user at the first time;
    rendering the 3D model at the determined first level-of-detail;
    determining that the head velocity of the user viewing the rendering of the 3D model has dropped below the first velocity threshold;
    applying a predetermined delay period when it is determined that the head velocity drops below the first velocity threshold, the 3D model being maintained at the first level-of-detail during the predetermined delay period; and
    after expiration of the predetermined delay period, increasing a level of detail at which the 3D model is rendered from the first level-of-detail to a second level-of-detail at a predetermined ramp rate, the second level-of-detail being greater than the first level-of-detail,
    wherein the predetermined ramp rate corresponds to a rate at which the level-of-detail of the 3D model is changed with respect to time such that the level-of-detail is increased over time in accordance with the predetermined ramp rate from the first level-of-detail to the second level-of-detail.

13. The computer-readable medium of claim 12, wherein the level-of-detail corresponds to at least one of an output resolution, a texture resolution or a geometric complexity of the rendered 3D model.

14. The computer-readable medium of claim 12, wherein the one or more processors form part of a head-mounted display configured to be worn by the user.

15. The computer-readable medium of claim 12, wherein the predetermined ramp rate corresponds to a linear ramp rate such that the level-of-detail is increased linearly over time from the first level-of-detail to the second level-of-detail.

16. The computer-readable medium of claim 12, wherein the level-of-detail corresponds to a resolution of the rendered 3D model such that the resolution of the rendered 3D model is ramped up over time from the first level-of-detail to the second level-of-detail.

* * * * *